United States Patent [19]

Lucarelli et al.

[11] Patent Number: 5,401,578
[45] Date of Patent: Mar. 28, 1995

[54] METHOD FOR PUTTING SILICONE ONTO POLYCARBONATE

[75] Inventors: Michael A. Lucarelli, Ballston Spa; John W. Raleigh, Rensselaer; Kimberlie A. Schryer, Clifton Park, all of N.Y.

[73] Assignee: General Electric Company, Waterford, N.Y.

[21] Appl. No.: 115,927

[22] Filed: Sep. 1, 1993

Related U.S. Application Data

[63] Continuation of Ser. No. 895,506, Jun. 8, 1992, abandoned.

[51] Int. Cl.⁶ .............................................. B32B 5/16
[52] U.S. Cl. .................................. 428/407; 524/267; 525/464
[58] Field of Search .................... 525/464; 428/407

[56] References Cited

U.S. PATENT DOCUMENTS

| | | | |
|---|---|---|---|
| 3,087,908 | 4/1963 | Caird | 525/464 |
| 3,742,083 | 6/1973 | Bialous | 525/464 |
| 3,933,730 | 1/1976 | Hoogeboom | 525/464 |
| 4,324,712 | 4/1982 | Vaughn, Jr. | 524/767 |
| 4,879,346 | 11/1989 | Bopp et al. | 525/146 |
| 4,914,143 | 4/1990 | Patel | 522/148 |

FOREIGN PATENT DOCUMENTS

| | | | |
|---|---|---|---|
| 697657 | 11/1964 | Canada | 525/464 |
| 2343275 | 3/1975 | Germany | 525/464 |

*Primary Examiner*—Ralph H. Dean

[57] ABSTRACT

A novel method for putting silicone onto polycarbonate is disclosed comprising preparing a mixture of a silicone, a polycarbonate and a solvent, heating the mixture to reflux and recovering the solid powdery residue.

11 Claims, No Drawings

METHOD FOR PUTTING SILICONE ONTO POLYCARBONATE

This is a continuation of application Ser. No. 07/895,506, filed on Jun. 8, 1992, now abandoned.

The present invention relates to a method for putting silicone onto polycarbonate. More particularly the present invention relates to depositing silicones onto powdered or solid polycarbonate. Most particularly, the present invention relates to preparing a solid polycarbonate having silicone deposited thereon.

BACKGROUND OF THE INVENTION

It is known in the art that the addition of silicone compositions to thermoplastic resins provides useful blends with many important physical and chemical properties. However, the silicone compositions are invariably added to the thermoplastic resins in the form of a liquid or a gum, thus forming a paste-like composition. Such a paste-like composition is difficult to handle with modern processing equipment, which is more suitable for handling totally solid systems. It would therefore represent a notable advance in the state of the art if a method for adding silicones to thermoplastic resins could be developed which forms a solid. Such a method would therefore provide a material having the improved physical or chemical properties and which is easy to handle and process by ordinary processing techniques.

SUMMARY OF THE PRESENT INVENTION

According to the present invention there is provided a method for putting silicone onto polycarbonate comprising the steps of (a) mixing or suspending (i) a polycarbonate resin and (ii) a silicone fluid in (iii) a solvent to form a mixture; (b) heating said mixture to reflux to remove the solvent; and (c) recovering powdery polycarbonate having silicone deposited thereon.

In preferred embodiments, the polycarbonate is a poly(bisphenol A) carbonate; the silicone is a polydimethylsiloxane and the solvent is toluene.

Also according to the present invention there is provided a powdery polycarbonate having silicone deposited thereon produced by a method comprising the steps of (a) mixing or suspending (i) a polycarbonate resin and (ii) a silicone in (iii) a solvent to form a mixture; (b) heating said mixture to reflux to remove the solvent; and (c) recovering powdery polycarbonate having silicone deposited thereon.

DETAILED DESCRIPTION OF THE PRESENT INVENTION

The present invention provides a novel method for preparing a solid polycarbonate having silicone deposited thereon.

The polycarbonates (a)(i) useful in the practice of the present invention are well known to those skilled in the art and can comprise non-aromatic as well as aromatic forms.

With respect to aromatic polycarbonates, these can be made by those skilled in this art or they can be obtained from a variety of commercial sources, i.e., Lexan ® from General Electric Company. They may be prepared by reacting a dihydric phenol with a carbonate precursor, such as phosgene, a haloformate or carbonate ester. Typically they will have recurring structural units of the formula:

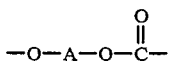

wherein A is a divalent aromatic radical of the dihydric phenol employed in the polymer producing reaction. Preferably, the aromatic carbonate polymers useful in the practice of the present invention have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis(4-hydroxyphenyl)propane; 2,2-bis(3,5-dimethyl-4-hydroxyphenyl)propane; 4,4'-di-hydroxydiphenyl ether; bis(2-hydroxyphenyl)methane, mixtures thereof and the like. The preferred aromatic carbonate polymer is a homopolymer derived from 2,2-bis(4-hydroxyphenyl)propane or bisphenol-A.

Component (a)(ii) of the compositions of the present invention are silicones. The term "silicone" as used herein is generic for a wide range of polysiloxane materials which can advantageously be utilized in the compositions of the present invention. For purposes of the instant specification it is intended that the expression "silicone" be construed as including those effective silicone materials as described by MacLaury and Holub in United States Patent No. 4,273,691 as well as other effective silicone materials, several of which will be described below. Typically effective silicone materials will be those silicone fluids or gums which are organopolysiloxane polymers comprised of chemically combined siloxy units typically selected from the group consisting of $R_3SiO_{0.5}$, $R_2SiO$, $R^1SiO_{1.5}$, $R^1R_2SiO_{0.5}$, $RR^1SiO$, $(R^1)_2SiO$, $RSiO_{1.5}$ and $SiO_2$ units and mixtures thereof wherein each R represents independently a saturated or unsaturated monovalent hydrocarbon radical, $R^1$ represents a radical such as R or a radical selected from the group consisting of a hydrogen atom, hydroxyl, alkoxy, aryl, vinyl, or allyl radicals etc. and wherein said organopolysiloxane has a viscosity ranging from about 600 to about 300,000,000 centipoise at 25° C. A preferred silicone material is a polydimethylsiloxane having a viscosity of approximately 90,000 to 150,000 centipoise at 25° C. Such effective silicone materials can be collectively referred to as silicone oils and are readily available under a wide variety of brand and grade designations.

Another useful silicone is a silanol chain-stopped polydiorganosiloxanes which can be represented by the general formula:

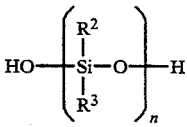

wherein $R^2$ and $R^3$ are each organic radicals of up to about 20, and preferably up to about 8 carbon atoms, selected from hydrocarbyl, halohydrocarbyl and cyano lower alkyl and n is a number that varies generally from about 10 to about 15,000, preferably from 100 to 3,000, and more preferably from 300 to 1,500.

The silanol chain-stopped polydiorganosiloxanes are well known in the art and they may be prepared by known methods, such as described in Beers, U.S. Pat. No. 3,382,205 and include compositions containing different $R^2$ and $R^3$ groups. For example, in formula (1) the $R^2$ groups can be methyl, while the $R^3$ groups can be phenyl and/or beta-cyano-ethyl and/or trifluoropropyl. Furthermore, within the scope of the definition of polydiorganosiloxanes useful in this invention are copolymers of various types of diorgansiloxane units, such as silanol chain-stopped copolymers of dimethylsiloxane units, diphenylsiloxane units, and methylphenyl siloxane units, or, for example, copolymers of dimethyl-siloxane units, methylphenyl-siloxane units and methyl-vinyl siloxane units. Preferably, at least 50% of the $R^2$ and $R^3$ groups of the silanol chain-stopped polydiorganosiloxanes are alkyl, e.g., methyl groups.

The silicones useful in the practice of the present invention can also suitably comprise alkoxy-modified silanes or polysiloxanes. The alkoxy-modified siloxanes within the scope of the present invention are those of the general formula

$$R_3^4SiO_{\frac{1}{2}}$$

wherein each $R^4$ is individually hydrogen, halogen or an organofunctional group such as alkyl, alkoxy or amino, provided at least one of the $R^4$ groups represents an alkoxy group such as methoxy, ethoxy or propoxy. Most preferred is where at least one of the $R^4$ groups is methoxy.

The alkoxy-modified polysiloxanes of the present invention can be represented by the formula $M'D_xM'$ wherein $M'$ represents a trifunctional siloxy group wherein the functionality is alkyl, vinyl, phenol, hydrogen, hydroxyl or epoxy, provided at least one of the functional groups in an $M'$ unit is alkoxy, and D represents a $R_2^5SiO_{2/2}$ unit wherein $R^5$ is hydrogen, halogen, alkyl, alkoxy, amino or aminoalkyl. Preferably, the alkoxy end group of $M'$ is a methoxy. Illustratively, the polysiloxane can be a compound such as methoxy end stopped dimethyl polysiloxane, a compound such as methoxy terminated aminoethylaminopropyl polysiloxane, or a compound such as aminopropyltrimethoxysilane.

It is further contemplated that the alkoxy-modified silanes and polysiloxanes of the present invention comprise a mixture of any of the contemplated silanes or polysiloxanes. Thus, a particularly useful alkoxy-modified component is a 75/25 weight ratio mixture of a methoxy end stopped dimethyl polysiloxane and methoxy terminated aminoethylaminopropyl polysiloxane.

These alkoxy-modified silanes and polysiloxanes can be prepared in accordance with procedures known to those of ordinary skill in the art, or are available commercially.

The silicone components of the compositions of the present invention can also comprise silicone resins dissolved in a silicone base. Silicone resins are well known materials coming in a variety of forms. Among the preferred silicone resins are MQ silicone resins. The expression "MQ silicone resin" refers to the fact that such resins are typically comprised primarily of monofunctional M units of the formula $R_3SiO_{0.5}$ and tetrafunctional Q units of the average formula $SiO_2$ having a specified ratio of M to Q units. A notably effective silicone resin for use in the present invention is poly-trimethylsilylsilicate which can have a ratio of, approximately, 0.3 to 4.0 M units per Q unit.

Thus, a suitable commercially available silicone useful in the practice of the present invention is a 2:1 blend of an MQ silicone resin and a silanol stopped methylsiloxane polymer silicone base, sold as SFR 100 from General Electric Company.

It is contemplated that other silicone soluble forms of solid silicone resins may be effective for use in the compositions of the present invention. Indeed, MT and TQ silicone resins (where T represents trifunctional RSi-$O_{1.5}$ units) may also be effective as well as mixtures and copolymers of each of the resins mentioned. These silicone resins are well known materials and are readily available. A criteria for suitability is that such effective silicone resinous materials be soluble or dispersible in the base silicones.

The solvents (a)(iii) for use in the present invention are generally those in which the silicone and polycarbonate are soluble or swell. Typically, these solvents comprise aliphatic and aromatic hydrocarbons. Useful aliphatic hydrocarbon solvents include n-hexane, heptane, octane and the like. Preferred aromatic hydrocarbons are selected from toluene, xylene and benzene. Particularly suitable for use in the present invention is toluene.

According to the method of the present invention, the polycarbonate solids having silicone deposited thereon is generally prepared by mixing together the polycarbonate, silicone and solvent in desired proportions in a suitable mixing vessel. The components are mixed and the resulting mixture is heated to reflux to remove the solvent.

The polycarbonate/silicone product is then recovered, such as by drying in an oven. It is also within the scope of the present invention to add additional solvent and polycarbonate to the residue and repeat the distilling step prior to recovery of the polycarbonate/silicone product.

In this manner, a polycarbonate/silicone powder can be obtained having from about 1 to about 50 weight percent silicone. More preferably, the product powder comprises from about 10 to about 30 weight percent silicone.

The polycarbonate powder having silicone deposited thereon can then be processed according to conventional procedures such as extrusion, to form a wide variety of useful articles.

DESCRIPTION OF PREFERRED EMBODIMENTS

The following examples illustrate the present invention. They are not to be construed to limit the scope of the appended claims in any manner whatsoever. The amounts of toluene used in the samples below, did not dissolve the polycarbonate but caused the polycarbonate to swell.

EXAMPLE 1

Four grams of SF 1706, a 25/75 mixture of methoxy terminated aminoethylaminopropyl polysiloxane and methoxy terminated methyl siloxane resin (General Electric Company) were admixed with 9.7 grams of poly(bisphenol A)carbonate, Lexan® 120 from General Electric Company, in 250 ml of toluene. The mixture was allowed to reflux for one hour while stirring. The toluene was removed on a rotoevaporator. The resultant solid looked like the starting polycarbonate.

This solid was then placed into a flask which contained 5 grams of SFR 100 and 100 ml of toluene. This mixture was then refluxed for one hour. The toluene was removed as before to give a semi-solid product. Twenty three grams of polycarbonate were then added to the flask followed by 100 ml of toluene. The material was refluxed for one hour and the toluene subsequently removed. The material was then transferred to a larger flask and placed into a 150° C. oven for one hour. Upon cooling, the final product was a solid. The total silicone content was 21.6% (theoretical).

EXAMPLE 2

100 ml of toluene, 9.4 grams of polycarbonate, Lexan ® 120 and 2.35 grams of SFR 100 were admixed and then refluxed for one hour. The toluene was removed by rotoevaporation. The resultant slurry was placed in a 150° C. oven for one hour. Upon cooling, a solid resembling the polycarbonate was isolated. The silicone content was 20.0% (theoretical).

The above-referenced patents are hereby incorporated by reference.

Many variations of the present invention will suggest themselves to those skilled in the art in light of the above-detailed description. It is contemplated that any of a wide variety of silicones and/or polycarbonates can be employed in the practice of the present invention. Further, solvents other than toluene, such as n-hexane, xylene or benzene may be employed in the practice of the present invention. All such obvious modifications are within the full intended scope of the appended claims.

We claim:

1. A composition comprising solid polycarbonate particles having silicone deposited thereon by means of a method comprising:
   (a) mixing or suspending a polycarbonate resin and a silicone in a solvent to form a mixture;
   (b) heating said mixture to reflux to remove the solvent; and
   (c) recovering powdery polycarbonate having silicone deposited thereon, wherein said powdery polycarbonate having silicone deposited thereon comprises from about 10 to about 50 weight percent silicone.

2. A composition as defined in claim 1 wherein said polycarbonate particles comprise poly(bisphenol A) carbonate.

3. A composition as defined in claim 1 wherein said silicone comprises organopolysiloxane polymers comprised of chemically combined siloxy units selected from the group consisting of $R_3SiO_{0.5}$, $R_2SiO$, $R^1SiO_{1.5}$, $R^1R_2SiO_{0.5}$, $RR^1SiO$, $(R^1)_2SiO$, $RSiO_{1.5}$, $SiO_2$ units and mixtures thereof wherein each R represents independently a saturated or unsaturated monovalent hydrocarbon radical, $R^1$ represents a radical selected from the group consisting of $R$, a hydrogen atom, a hydroxyl radical and an alkoxy.

4. A composition as defined in claim 1 wherein said silicone comprises an alkoxy modified polysiloxane selected from those of the general formula $R_3^4SiO_{0.5}$ wherein each $R^4$ is individually hydrogen, halogen or an organofunctional group alkyl, alkoxy or amino, provided at least one of the $R^4$ groups represents an alkoxy group.

5. A composition as defined in claim 4 wherein at least one of the $R^4$ groups is selected from methoxy, ethoxy or propoxy.

6. A composition as defined in claim 5 wherein at least one of the $R^4$ groups is methoxy.

7. A composition as defined in claim 4 wherein said alkoxy modified linear polysiloxane fluid comprises a mixture of 25 weight percent methoxy terminated aminoethylaminopropyl polysiloxane and 75 weight percent of methoxy terminated methyl siloxane resin.

8. A composition as defined in claim 1 wherein said silicone comprises a silanol chain-stopped polydiorganosiloxane of the general formula:

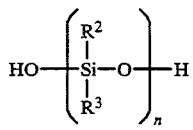

wherein $R^2$ and $R^3$ are each organic radicals of up to about 20 carbon atoms selected from hydrocarbyl, halohydrocarbyl or cyano lower alkyl and n is a number that varies generally from about 10 to about 15,000.

9. A composition as defined in claim 1 wherein said silicone comprises a silicone resin dissolved in a silicone base material.

10. A composition as defined in claim 9 wherein said silicone resin dissolved in a silicone comprises an MQ resin dissolved in a silicone base stopped methylsiloxane polymer.

11. A powdery polycarbonate having silicone deposited thereon by a method comprising:
   (a) mixing or suspending a polycarbonate resin and a silicone in a solvent comprising toluene to form a mixture;
   (b) heating said mixture to reflux to remove the solvent and to form a semisolid or a slurry: and
   (c) recovering powdery polycarbonate having silicone deposited thereon wherein the powdery polycarbonate having silicone deposited thereon comprises from about 10 to about 50 weight percent polycarbonate.

* * * * *